United States Patent
Chen et al.

(10) Patent No.: US 10,425,850 B2
(45) Date of Patent: Sep. 24, 2019

(54) METHOD AND DEVICE FOR DETERMINING INDICATION SIGNALLING OF PILOT SIGNAL FOR CHANNEL MEASUREMENT AND METHOD AND DEVICE FOR FEEDING BACK CSI

(71) Applicant: ZTE Corporation, Shenzhen (CN)

(72) Inventors: Yijian Chen, Shenzhen (CN); Bo Dai, Shenzhen (CN); YuNgok Li, Shenzhen (CN); Yunfeng Sun, Shenzhen (CN); Senbao Guo, Shenzhen (CN)

(73) Assignee: XI'AN Zhongxing New Software Co., LTD., Shaanxi (CN)

( * ) Notice: Subject to any disclaimer, the term of this patent is extended or adjusted under 35 U.S.C. 154(b) by 149 days.

(21) Appl. No.: 14/773,669

(22) PCT Filed: Mar. 6, 2014

(86) PCT No.: PCT/CN2014/072977
§ 371 (c)(1),
(2) Date: Sep. 8, 2015

(87) PCT Pub. No.: WO2014/135100
PCT Pub. Date: Sep. 12, 2014

(65) Prior Publication Data
US 2016/0029238 A1    Jan. 28, 2016

(30) Foreign Application Priority Data
Mar. 8, 2013    (CN) .......................... 2013 1 0074674

(51) Int. Cl.
*H04W 24/10*    (2009.01)
*H04L 5/00*    (2006.01)
(Continued)

(52) U.S. Cl.
CPC .......... *H04W 24/10* (2013.01); *H04L 5/0048* (2013.01); *H04W 72/042* (2013.01);
(Continued)

(58) Field of Classification Search
None
See application file for complete search history.

(56) References Cited

U.S. PATENT DOCUMENTS

2012/0208547 A1    8/2012    Geirhofer et al.
2012/0287875 A1*    11/2012    Kim .................. H04B 7/024
                                                       370/329
(Continued)

FOREIGN PATENT DOCUMENTS

CN    102414999 A    4/2012
CN    102696183 A    9/2012
(Continued)

OTHER PUBLICATIONS

International Search Report for corresponding application PCT/CN2014/072977 filed Mar. 6, 2014; dated Jun. 30, 2014.
(Continued)

*Primary Examiner* — Chi H Pham
*Assistant Examiner* — Raul Rivas
(74) *Attorney, Agent, or Firm* — Cantor Colburn LLP

(57) ABSTRACT

Provided are a method and device for determining indication signalling of a pilot signal for channel measurement, and method and device for feeding back CSI. The method for determining indication signalling of pilot signal for channel measurement includes: a NodeB sends DL control signalling, which includes transmission resource configuration information of a non-periodic CSI-RS, to a terminal, wherein the transmission resource configuration information of the non-periodic CSI-RS is used for determining a location of the non-periodic CSI-RS, and the non-periodic
(Continued)

CSI-RS is used for instructing the terminal to perform channel measurement. The non-periodic CSI-RS is determined according to the transmission resource configuration information of the non-periodic CSI-RS, and channel measurement is further performed according to the non-periodic CSI-RS, so that the problems of higher overhead and resource waste caused by periodical sending of a CSI-RS in the related art may be solved, resources are saved, and sending overhead is reduced.

12 Claims, 4 Drawing Sheets

(51) Int. Cl.
*H04W 72/04* (2009.01)
*H04W 72/14* (2009.01)
*H04W 76/27* (2018.01)
*H04W 88/02* (2009.01)
*H04W 88/08* (2009.01)

(52) U.S. Cl.
CPC ........... *H04W 72/14* (2013.01); *H04W 76/27* (2018.02); *H04W 88/02* (2013.01); *H04W 88/08* (2013.01)

(56) References Cited

U.S. PATENT DOCUMENTS

2012/0314685 A1* 12/2012 Chen .................... H04L 5/0057
370/329
2013/0003788 A1    1/2013 Marinier et al.

FOREIGN PATENT DOCUMENTS

EP          2725845 A1    4/2014
WO       2013021531 A1    2/2013

OTHER PUBLICATIONS

"3rd Generation Partnership Project; Techincal Specification Group Radio Access Network; Evolved Universal Terrestrial Radio Access (E-UTRA); Phiysical Layer Procedures (Release 11)" 3gpp Standard ; 3GPP TS 36.213, 3rd Generation Partnership Porject (3GPP), vol. RAN WG1, No. V111.1.0, Dec. 20, 2012, pp. 1-160, XP050691223 [Retrieved on Dec. 20, 2012].

Supplementary European Search Report App. No. EP14760993; dated Feb. 12, 2016; pp. 7.

Huawei, et al: "Signaling for PDSCH RE Mapping and Quasi Co-Location in DCI Format 2D"; 3GPP TSG RAN WG1 Meeting #7; R1-124692; Nov. 12-16, 2012; pp. 2.

* cited by examiner

METHOD AND DEVICE FOR DETERMINING INDICATION SIGNALLING OF PILOT SIGNAL FOR CHANNEL MEASUREMENT AND METHOD AND DEVICE FOR FEEDING BACK CSI

TECHNICAL FIELD

The present disclosure relates to the field of communications, and in particular to a method and device for determining indication signalling of a pilot signal for channel measurement, and a method and device for feeding back Channel State Information (CSI).

BACKGROUND

In a wireless communication system, a sender and a receiver achieve higher rates in a spatial multiplexing manner by virtue of multiple antennae. The receiver needs to perform channel measurement according to a pilot signal sent by the sender and feeds back channel information to the sender, and the sender uses some sending pre-coding technologies according to obtained CSI to greatly improve transmission performance. In a Long Term Evolution (LTE) system, channel information is obtained by measuring and estimating channel according to a Cell specific Reference Signal (CRS) or a Channel State Information Reference Signal (CSI-RS). In a newer protocol version, CSI-RS-based channel measurement is mainly adopted.

In a related art, a NodeB may periodically send one or more sets of CSI-RSs, and a terminal uses these CSI-RSs for channel measurement, and then feeds back CSI to the NodeB. The CSI-RS is significant for performance of a Multiple Input Multiple Output (MIMO) system. Generally, each antenna sends one channel measurement pilot signal. Locations of channel measurement pilot signals sent by different antennae in the time and frequency domains or the code domain are staggered, and may be kept orthogonal without mutual interference, and each antenna corresponds to one CSI-RS port. The terminal may measure physical channels between its receiving antennae and sending antennae at a receiver, thereby obtaining an Nr*Nt channel matrix, wherein Nr is the number of the receiving antennae, and Nt is the number of the sending antennae.

A location of a subframe for sending a CSI-RS in the time domain and a location of a Resource Element (RE) in the subframe are introduced below. In the time domain, a channel may not be suddenly changed, and each subframe is only 1 ms, so that it is unnecessary to send all subframes. A CSI-RS may be shared by all User Equipment (UE), so that the CSI-RS is periodically sent under a normal circumstance. Regulations in standard 36.211 of LTE are shown in Table 1, i.e. CSI-RS subframe configuration.

TABLE 1

| CSI-RS-SubframeConfig $I_{CSI-RS}$ | CSI-RS periodicity $T_{CSI-RS}$ (subframes) | CSI-RS subframe offset $Delta_{CSI-RS}$ (subframes) |
| --- | --- | --- |
| 0–4 | 5 | $I_{CSI-RS}$ |
| 5–14 | 10 | $I_{CSI-RS}$-5 |
| 15–34 | 20 | $I_{CSI-RS}$-15 |
| 35–74 | 40 | $I_{CSI-RS}$-35 |
| 75–154 | 80 | $I_{CSI-RS}$-75 |

In table 1, $I_{CSI-RS}$ is a configuration parameter of a CSI-RS, and is valued from 0 to 154, and different values may correspond to different CSI-RS periodicities and subframe offsets. FIG. 1 is a diagram of locations of subframes corresponding to a part of CSI-RS configuration examples, the subframe locations corresponding to the configurations of $I_{CSI-RS}$=0, $I_{CSI-RS}$=2 and $I_{CSI-RS}$=5 respectively.

At a frequency-domain location, there is a CSI-RS in each Physical Resource Block (PRB) pair, and a sending pattern of the same port in different PRB pairs is the same. A pattern of a CSI-RS is shown in FIG. 2. A PRB pair may refer to a regulation in LTE protocol 36.211, and a typical condition includes 12 frequency-domain subcarriers and 14 time-domain Orthogonal Frequency Division Multiplexing (OFDM) symbols.

An LTE system defines that 40 REs in one PRB pair may be used as CSI-RSs and are divided into 5 patterns, and each pattern includes 8 REs, as shown in the FIG. 1. Each port of the CSI-RS averagely occupies one RE in one PRB pair, and all the ports belonging to the same CSI-RS resource are required to be limited in one pattern. At present, one set of CSI-RSs may support maximally 8 ports, so that there are five location candidates when the number of the ports is 8, there are 10 configurable locations when the number of the ports is 4 and there are 20 configurations when the number of the ports is 2.

In the related art, a CSI-RS is a Cell/Transmission Point (TP) specific design, a NodeB is not allowed to perform pre-coding processing when sending a CSI-RS, and it is mainly because the CSI-RS is shared by multiple pieces of UE in a cell, the CSI-RS may be pre-coded only according to a characteristic of a channel between the NodeB to one piece of UE if it is necessary to pre-code the CSI-RS, which may cause influence on the measurement of the other UE and disable the other UE to accurately measure physical channels between Nr receiving antennae and Nt sending antennae, and pre-coding according to characteristics of channels of the other UE may make it impossible to accurately calculate and report own CSI.

In addition, the CSI-RS is periodically sent in the related art. At present, maximally 8 antennae are supported, so that overhead in the CSI-RS is not so high. However, for a condition of more antennae, pilot overhead of such a method may be greatly increased along with multiplication of the number of the antennae, which may cause influence on spectrum efficiency of a system.

Moreover, corresponding to a high-dimensional CSI-RS, CSI calculation may be more complex, terminal complexity is high and time consumption in CSI calculation is higher.

Therefore, the following major problems exist in the related art: a CSI-RS is periodically sent, so that overhead is higher, and resources are wasted; the CSI-RS is cell/TP specific, so that pre-coding is not allowed, and the number of ports may not further be effectively reduced; and when there are more antennae, the overhead is high, and CSI feedback is large in calculation amount and high in complexity.

SUMMARY

The embodiments of the present disclosure provide a method and device for determining indication signalling of a pilot signal for channel measurement, a method and device for triggering Channel State Information (CSI) feedback and a method and device for feeding back CSI, so as to at least solve the problems of higher overhead and resource waste caused by periodical sending of a CSI-RS in the related art.

According to one aspect of the embodiments of the present disclosure, a method for determining indication signalling of a pilot signal for channel measurement is provided, which includes that: a NodeB sends Downlink (DL) control signalling, which includes transmission resource configuration information of a non-periodic CSI-RS, to a terminal, wherein the transmission resource configuration information of the non-periodic CSI-RS is used for determining a location of the non-periodic CSI-RS, and the non-periodic CSI-RS is used for instructing the terminal to perform channel measurement.

In an example embodiment, the transmission resource configuration information of the non-periodic CSI-RS includes at least one of: information indicating a location of a subframe for sending the non-periodic CSI-RS, information indicating a location of a PRB pair for sending the non-periodic CSI-RS, information indicating the number of CSI-RS ports of the non-periodic CSI-RS, and information indicating a location of RE, which is used for sending the non-periodic CSI-RS, in a PRB pair.

In an example embodiment, the step that the NodeB sends the DL control signalling, which includes the transmission resource configuration information of the non-periodic CSI-RS, to the terminal includes at least one of the following steps: the NodeB sends a notice about the information indicating the location of the subframe to the terminal through physical layer configuration signalling; the NodeB sends a notice about the information indicating the location of the PRB pair to the terminal through physical layer control signalling; the NodeB sends a notice about the information indicating the number of the CSI-RS ports to the terminal through physical layer signalling and/or Radio Resource Control (RRC) signalling; and the NodeB sends a notice about the information indicating the location of the RE, which is used for sending the non-periodic CSI-RS, in the PRB pair to the terminal through the physical layer signalling and/or the RRC signalling.

In an example embodiment, a method for determining a location for sending the non-periodic CSI-RS includes: determining the location for sending the non-periodic CSI-RS according to the information indicating the location of the subframe carried in the physical layer configuration signalling received by the terminal and a preset rule.

In an example embodiment, the step that the NodeB sends the notice about the information indicating the location of the PRB pair to the terminal through the physical layer control signalling includes that: the NodeB and the terminal preset multiple sets of locations of transmission Resource Blocks (RBs), wherein each of the multiple sets of locations of transmission RBs corresponds to one RB Group, and one RB Group corresponds to a part of state locations of Downlink Control Information (DCI).

In an example embodiment, each of the multiple sets of locations of transmission RBs includes at least one of: (1) RB1 to RB[M/4]; (2) RB[M/4+1] to RB[M/2]; (3) RB[M/2+1] to RB[3M/4]; (4) RB[3M/4+1] to RB[M]; (5) RB1 to RB[M/2]; (6) RB[M/2+1] to RB[M]; (7) all RBs with odd index values; (8) all RBs with even indexes; and (9) the latest RBs transmitting a Physical Downlink Shared Channel (PDSCH), wherein M is the number of PRB pairs corresponding to a current bandwidth.

In an example embodiment, the preset multiple sets of locations of transmission RBs are specified by a protocol in advance, or the preset multiple sets of locations of transmission RBs are agreed by the NodeB through a high-layer signalling configuration.

In an example embodiment, the number of CSI-RS ports of the non-periodic CSI-RS and the information indicating the location of the RE, which is used for sending the non-periodic CSI-RS, in the PRB pair are joint-coded.

In an example embodiment, the step that the NodeB sends the DL control signalling, which includes the transmission resource configuration information of the non-periodic CSI-RS, to the terminal includes that: the NodeB sends the transmission resource configuration information of the non-periodic CSI-RS and resource allocation information of a PDSCH to the terminal in the same control signalling format of the DL control signalling; or, the NodeB sends the transmission resource configuration information of the non-periodic CSI-RS and resource allocation information of a Physical Uplink Shared Channel (PUSCH) to the terminal in the same control signalling format of the DL control signalling.

In an example embodiment, the transmission resource configuration information of the non-periodic CSI-RS is sent in N preset subframes of the DL control signalling, wherein N is an integer more than 1.

According to one aspect of the embodiments of the present disclosure, a method for triggering CSI feedback is provided, which includes that: a NodeB sends CSI feedback triggering instruction information and resource allocation information of a PDSCH to a terminal in the same control signalling format of DL control signalling, wherein the CSI feedback triggering instruction information is used for instructing the terminal to feed back CSI.

In an example embodiment, a manner for setting the CSI feedback triggering instruction information includes: setting transmission resource configuration information of the non-periodic CSI-RS to represent the CSI feedback triggering instruction information; setting Qbit signalling in the control signalling format to represent the CSI feedback triggering instruction information; or, setting a partial state bit in the control signalling format to represent the CSI feedback triggering instruction information.

In an example embodiment, setting the Qbit signalling in the control signalling format to represent the CSI feedback triggering instruction information includes: setting a state of not triggering CSI acquisition, and setting the other states except the state of not triggering CSI acquisition to represent different rules for triggering acquisition and feedback.

In an example embodiment, the terminal acquires and/or feeds back the CSI in one of manners as follows: when the CSI feedback triggering instruction information triggers CSI feedback, the terminal acquires and feeds back the CSI on the basis of a periodic CSI-RS or a Cell specific Reference Signal (CRS); when the CSI feedback triggering instruction information triggers CSI feedback, the terminal acquires and feeds back the CSI according to a frequency-domain resource where the PDSCH corresponding to the DL control signalling locates; when the CSI feedback triggering instruction information triggers CSI feedback, the terminal determines the acquisition and feedback of the CSI according to a feedback mode configured by the DL control signalling; when DL Grant of the DL control signalling triggers CSI feedback, the terminal feeds back the CSI on the Nth subframe after the DL Grant triggers CSI feedback, wherein N is a natural number more than or equal to 1, and a value of N is a fixed integer or configured by high-layer signalling; and when the CSI feedback triggering instruction information triggers CSI feedback, the terminal feeds back the CSI at a preset location in a subframe, wherein the preset location includes one of: a Physical Uplink Control Channel (PUCCH) for feedback and a PUSCH for feedback on a preset bandwidth.

In an example embodiment, the step that the terminal acquires and feeds back the CSI according to the frequency-domain resource where the PDSCH corresponding to the DL control signalling locates includes that: the terminal acquires the CSI on the basis of a Demodulation Reference Signal (DMRS) corresponding to the PDSCH.

In an example embodiment, when the terminal feeds back the CSI at the preset location in the subframe by virtue of the PUCCH, the CSI is transmitted together with Acknowledgement (ACK or A)/Non-Acknowledgement (NACK or N).

According to one aspect of the embodiments of the present disclosure, a method for feeding back CSI is provided, which includes that: a terminal receives CSI feedback triggering instruction information from a NodeB, wherein the CSI feedback triggering instruction information and resource allocation information of a PDSCH are sent in the same control signalling format of DL control signalling; and the terminal feeds back CSI acquired according to the CSI feedback triggering instruction information to the NodeB.

In an example embodiment, the step that the terminal receives the CSI feedback triggering instruction information from the NodeB includes that: the terminal receives transmission resource configuration information of the non-periodic CSI-RS from the NodeB; or, the terminal receives one piece of state information of preset Qbit signalling from the NodeB; or, the terminal receives a partial state bit set in the control signalling format from the NodeB.

In an example embodiment, the step that the terminal feeds back the CSI acquired according to the CSI feedback triggering instruction information to the NodeB includes one of the following steps: the terminal acquires and feeds back the CSI according to a channel measurement pilot at a resource location of a non-periodic CSI-RS, wherein the non-periodic CSI-RS is a signal sent by the NodeB to instruct the terminal to perform channel measurement; the terminal acquires and feeds back the CSI according to a periodic CRI-RS or a CRS; and the terminal acquires and feeds back the CSI according to a frequency-domain resource where a PDSCH corresponding to DCI locates.

In an example embodiment, the method for feeding back CSI further includes that: the terminal feeds back the CSI on the Nth subframe after the CSI feedback triggering instruction information triggers CSI feedback, wherein N is a natural number more than or equal to 1, and a value of N is a fixed integer or configured by high-layer signalling; and the terminal feeds back the CSI at a preset location in a subframe, wherein the preset location includes one of: a PUCCH for feedback and a PUSCH for feedback on a preset bandwidth.

In an example embodiment, when the CSI is fed back at the preset location in the subframe by a PUCCH, the CSI and A/N are transmitted together.

According to one aspect of the embodiments of the present disclosure, a device for determining indication signalling of a pilot signal for channel measurement is provided, which is applied to a NodeB and includes: a first sending component, configured to send DL control signalling, which includes transmission resource configuration information of the non-periodic CSI-RS, to a terminal, wherein the transmission resource configuration information of the non-periodic CSI-RS is used for determining a location of the non-periodic CSI-RS, and the non-periodic CSI-RS is used for instructing the terminal to perform channel measurement.

In an example embodiment, the transmission resource configuration information of the non-periodic CSI-RS sent by the first sending component includes at least one of: information indicating a location of a subframe for sending the non-periodic CSI-RS, information indicating a location of a PRB pair for sending the non-periodic CSI-RS, information indicating the number of CSI-RS ports of the non-periodic CSI-RS, and information indicating a location of RE, which is used for sending the non-periodic CSI-RS, in a PRB pair.

In an example embodiment, the first sending component sends the DL control signalling, which includes the transmission resource configuration information of the non-periodic CSI-RS, in at least one of manners as follows: sending a notice about the information indicating the location of the subframe to the terminal through physical layer configuration signalling; sending a notice about the information indicating the location of the PRB pair to the terminal through physical layer control signalling; sending a notice about the information indicating the number of the CSI-RS ports to the terminal through physical layer signalling and/or RRC signalling; and sending a notice about the information indicating the location of the RE, which is used for sending the non-periodic CSI-RS, in the PRB pair to the terminal through the physical layer signalling and/or the RRC signalling.

According to one aspect of the embodiments of the present disclosure, a device for triggering CSI feedback is provided, which is applied to a NodeB and includes: a second sending component, configured to send CSI feedback triggering instruction information and resource allocation information of a PDSCH to a terminal in the same control signalling format of DL control signalling, wherein the CSI feedback triggering instruction information is used for instructing the terminal to feed back CSI.

In an example embodiment, the device further includes a setting component configured to set a representation manner for the CSI feedback triggering instruction information, wherein the setting component is configured to set the CSI feedback triggering instruction information in one of manners as follows: setting transmission resource configuration information of the non-periodic CSI-RS to represent the CSI feedback triggering instruction information; setting Qbit signalling in the control signalling format to represent the CSI feedback triggering instruction information; and setting a partial state bit in the control signalling format to represent the CSI feedback triggering instruction information.

According to one aspect of the embodiments of the present disclosure, a device for feeding back CSI is provided, which is applied to a terminal and includes: a receiving component, configured to receive CSI feedback triggering instruction information from a NodeB, wherein the CSI feedback triggering instruction information and resource allocation information of a PDSCH are sent in the same control signalling format of DL control signalling; and a feedback component, configured to feed back CSI acquired according to the CSI feedback triggering instruction information to the NodeB.

In an example embodiment, the receiving component includes: a first receiving element, configured to receive transmission resource configuration information of a non-periodic CSI-RS from the NodeB; a second receiving element, configured to receive one piece of state information of preset Qbit signalling from the NodeB; and a third receiving element, configured to receive a partial state bit set in the control signalling format from the NodeB.

In an example embodiment, the feedback component feeds back the CSI acquired according to the CSI feedback triggering instruction information to the NodeB in at least one of manners as follows: acquiring and feeding back the CSI according to a channel measurement pilot at a resource location of a non-periodic CSI-RS, wherein the non-periodic CSI-RS is a signal sent by the NodeB to instruct the terminal to perform channel measurement; acquiring and feeding back the CSI according to a periodic CM-RS or a CRS; acquiring and feeding back the CSI according to a frequency-domain resource where a PDSCH corresponding to DCI locates; feeding back the CSI on the Nth subframe after the CSI feedback triggering instruction information triggers CSI feedback, wherein N is a natural number more than or equal to 1, and a value of N is a fixed integer or configured by high-layer signalling; and feeding back the CSI at a preset location in a subframe, wherein the preset location includes one of: a PUCCH for feedback and a PUSCH for feedback on a preset bandwidth.

According to the embodiments of the present disclosure, the following method is adopted: the NodeB sends DL control signalling, which includes the transmission resource configuration information of the non-periodic CSI-RS, to the terminal, wherein the transmission resource configuration information of the non-periodic CSI-RS is used for determination of the location of the non-periodic CSI-RS, and the terminal performs channel measurement according to the non-periodic CSI-RS. By the embodiments of the present disclosure, the non-periodic CSI-RS is determined according to the transmission resource configuration information of the non-periodic CSI-RS, and channel measurement is further performed according to the non-periodic CSI-RS, so that the problems of higher overhead and resource waste caused by periodical sending of a CSI-RS in the related art may be solved, resources are saved, and sending overhead is reduced.

BRIEF DESCRIPTION OF THE DRAWINGS

The drawings described here are adopted to provide further understanding of the embodiment of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure is described below with reference to the drawings and embodiments in detail. It is important to note that the embodiments in the present disclosure and characteristics in the embodiments can be combined under the condition of no conflicts.

Figure 1:
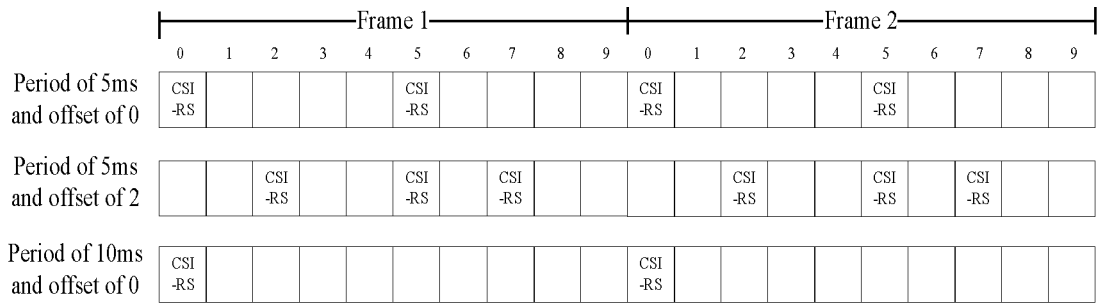
FIG. 1 is a diagram of locations of subframes corresponding to a part of CSI-RS configuration examples according to the related art.
Figure 2:
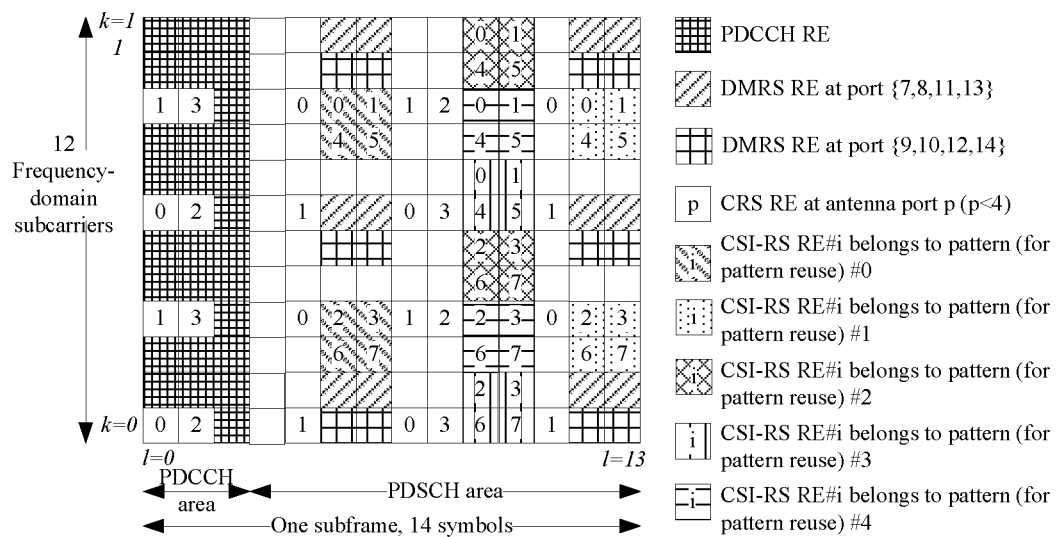
FIG. 2 is a diagram of a pattern of CSI-RS according to the related art.
Figure 3:
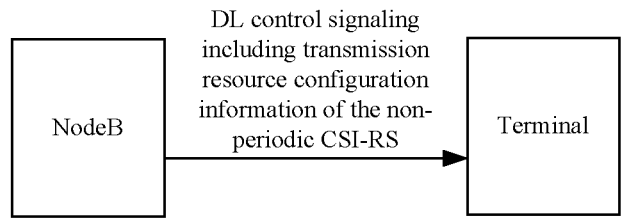
FIG. 3 is a flowchart of a method for determining indication signalling of pilot signal for measuring channel according to an embodiment of the present disclosure.

For the problems of higher overhead and resource waste caused by periodical sending of the CSI-RS in the related art, the embodiments of the present disclosure provide a method for determining indication signalling of pilot signal for channel measurement. As shown in FIG. 3, the method is implemented as follows:

a NodeB sends DL control signalling, which includes transmission resource configuration information of the non-periodic CSI-RS to a terminal, wherein the transmission resource configuration information of the non-periodic CSI-RS is used for determining a location of a non-periodic CSI-RS (a channel measurement pilot), and the non-periodic CSI-RS is used for indicating the terminal to perform channel measurement.

According to the embodiment of the present disclosure, the non-periodic CSI-RS is determined according to the transmission resource configuration information of the non-periodic CSI-RS, and channel measurement is further performed by using the non-periodic CSI-RS, so that the problems of higher overhead and resource waste caused by periodical sending of the CSI-RS in the related art may be solved, resources are saved, and sending overhead is reduced.

In an implementation process, there may be multiple pieces of transmission resource configuration information of the non-periodic CSI-RS, and the transmission resource configuration information of the non-periodic CSI-RS includes at least one piece of: information indicating a location of a subframe for sending the non-periodic CSI-RS, information indicating a location of PRB pair for sending the non-periodic CSI-RS, information indicating the number of ports of the non-periodic CSI-RS and information indicating a location of RE, which is used for sending the non-periodic CSI-RS, in a PRB pair.

Regardless of which of the above information that the transmission resource configuration information of the non-periodic CSI-RS includes, the transmission resource configuration information of the non-periodic CSI-RS may be sent in different forms, then the step that the NodeB sends the DL control signalling, which includes the transmission resource configuration information of the non-periodic CSI-RS, to the terminal includes any one or more of the following steps:

the NodeB sends a notice about information indicating the location of the subframe to the terminal through physical layer configuration signalling; the NodeB sends a notice about information indicating the location of the PRB pair to the terminal through physical layer control signalling; the NodeB sends a notice about information indicating the number of ports of the CSI-RS to the terminal through physical layer signalling and/or RRC signalling; and the NodeB sends a notice about information indicating the location of the RE, which is used for sending the non-periodic CSI-RS, in the PRB pair to the terminal through the physical layer signalling and/or the RRC signalling.

The step that the NodeB sends the notice about information indicating the location of the PRB pair to the terminal through the physical layer control signalling may include the following process: the NodeB and the terminal preset multiple sets of locations of transmission RBs, wherein each of the multiple sets of locations of transmission RBs corresponds to one RB Group, and one RB Group corresponds to a part of state locations of DCI. Each of the multiple sets of locations of transmission RBs comprises at least one of: (1) RB1 to RB[M/4]; (2) RB[M/4+1] to RB[M/2]; (3) RB[M/2+1] to RB[3M/4]; (4) RB[3M/4+1] to RB[M]; (5) RB1 to RB[M/2]; (6) RB[M/2+1] to RB[M]; (7) all RBs with odd index values; (8) all RBs with even indexes; and (9) the latest RB transmitting a PDSCH, wherein M is the number of the PRB pairs corresponding to a current bandwidth. The preset multiple sets of locations of transmission RBs are specified by a protocol in advance, or the preset multiple sets of locations of transmission RBs are agreed by the NodeB through a high-layer signalling configuration.

In the implementation process, the number of CSI-RS ports of the non-periodic CSI-RS and the information indicating the location of the RE, which is used for sending the non-periodic CSI-RS, in the PRB pair may be joint-coded. By such a pre-coding supporting method, the number of the ports may be effectively reduced, and the calculation amount of CSI feedback may further be reduced.

After the NodeB sends the transmission resource configuration information of the non-periodic CSI-RS, the terminal may determine a location for sending the non-periodic CSI-RS according to the received transmission resource configuration information of the non-periodic CSI-RS. For example, the terminal may determine the location for sending the non-periodic CSI-RS according to the information indicating the location of the subframe and a preset rule, wherein the information indicating the location of the subframe is carried in the physical layer configuration signalling received by the terminal.

When the transmission resource configuration information of the non-periodic CSI-RS is sent, the NodeB may send the transmission resource configuration information of the non-periodic CSI-RS and resource allocation information of the PDSCH to the terminal in the same control signalling format of the DL control signalling; and the NodeB may also send the transmission resource configuration information of the non-periodic CSI-RS and resource allocation information of a PUSCH to the terminal in the same control signalling format of the DL control signalling. When the transmission resource configuration information of the non-periodic CSI-RS is sent, the transmission resource configuration information of the non-periodic CSI-RS may be sent in N preset subframes of the DL control signalling, for example, the DL control signalling has 100 subframes, and the CSI-RS may be sent on the first and second continuous subframes; alternatively, the CSI-RS may also be sent on preset subframes, for example, on the first subframe, the sixth subframe and the 16th subframe. A value of N is an integer more than 1.

Figure 4:
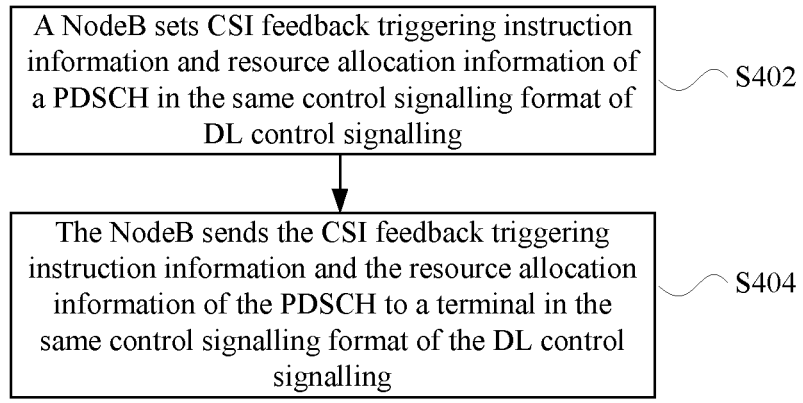
FIG. 4 is a flowchart of a method for triggering CSI feedback according to an embodiment of the present disclosure.

An embodiment further provides a method for triggering CSI feedback, and as shown in FIG. 4, the flow of the method includes the following Step 402 to Step 404.

Step 402: a NodeB sets CSI feedback triggering instruction information and resource allocation information of a PDSCH in the same control signalling format of DL control signalling; and Step 404: the NodeB sends the CSI feedback triggering instruction information and the resource allocation information of the PDSCH to a terminal in the same control signalling format of the DL control signalling, wherein the CSI feedback triggering instruction information is used for instructing the terminal to feed back CSI.

There may be multiple manners for setting the CSI feedback triggering instruction information, for example, setting transmission resource configuration information of the non-periodic CSI-RS to represent the CSI feedback triggering instruction information; or, setting Qbit signalling in the control signalling format to represent the CSI feedback triggering instruction information; or, setting a partial state bit in the control signalling format to represent the CSI feedback triggering instruction information. If the Qbit signalling in the control signalling format is set to represent the CSI feedback triggering instruction information, a state of not triggering CSI acquisition may be set, and the other states except the state of not triggering CSI acquisition may be set to represent different rules for triggering acquisition and feedback.

In an implementation process, the terminal may acquire and feed back the CSI in multiple manners as follows: (1) when the CSI feedback triggering instruction information triggers CSI feedback, the terminal acquires and feeds back the CSI on the basis of a periodic CSI-RS or a CRS; (2) when the CSI feedback triggering instruction information triggers CSI feedback, the terminal acquires and feeds back the CSI according to a frequency-domain resource where the PDSCH corresponding to the DL control signalling locates; (3) when the CSI feedback triggering instruction information triggers CSI feedback, the terminal determines the acquisition and feedback of the CSI according to a feedback mode configured by the DL control signalling; (4) when DL Grant of the DL control signalling triggers CSI feedback, the terminal feeds back the CSI on the Nth subframe after the DL Grant triggers CSI feedback, wherein N is a natural number more than or equal to 1, and a value of N is a fixed integer or configured by high-layer signalling; and (5) when the CSI feedback triggering instruction information triggers CSI feedback, the terminal feeds back the CSI at a preset location in a subframe, wherein the preset location includes one of: a PUCCH for feedback and a PUSCH for feedback on a preset bandwidth.

If the terminal acquires and feeds back the CSI according to the frequency-domain resource where the PDSCH corresponding to the DL control signalling locates, the terminal may acquire the CSI on the basis of a DMRS corresponding to the PDSCH. If the terminal feeds back the CSI at the preset location in the subframe by using the PUCCH, the CSI and A/N may be transmitted together.

Figure 5:
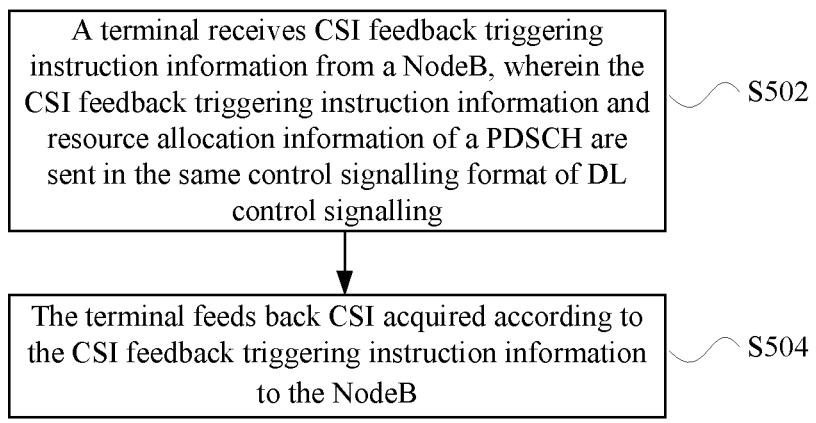
FIG. 5 is a flowchart of a method for feeding back CSI according to an embodiment of the present disclosure.

The embodiment of the present disclosure further provides a method for feeding back CSI. The method may be executed after CSI feedback is triggered by the method for triggering CSI feedback. As shown in FIG. 5, the flow of the method for feeding back CSI may include the following Step 502 to Step 504.

Step 502: a terminal receives CSI feedback triggering instruction information from a NodeB, wherein the CSI feedback triggering instruction information and resource allocation information of a PDSCH are sent in the same control signalling format of DL control signalling; and Step 504: the terminal feeds back CSI acquired according to the CSI feedback triggering instruction information to the NodeB.

The terminal may receive the CSI feedback triggering instruction information according to different triggering instruction information sent by the NodeB, for example, the terminal may receive transmission resource configuration information of the non-periodic CSI-RS from the NodeB; or, the terminal may receive one piece of state information of preset Qbit signalling from the NodeB; or, the terminal may receive a partial state bit set in the control signalling format from the NodeB.

In an implementation process, the terminal feeds back the CSI acquired according to the CSI feedback triggering instruction information to the NodeB, and during this procedure, the terminal may acquire and feed back the CSI in multiple manners, for example, the terminal acquires and feeds back the CSI in one of manners as follows: (1) the terminal acquires and feeds back the CSI according to a pilot signal for channel measurement at a resource location of a non-periodic CSI-RS, wherein the non-periodic CSI-RS is a signal sent by the NodeB to instruct the terminal to perform channel measurement; (2) the terminal acquires and feeds back the CSI according to a periodic CRI-RS or a CRS; and (3) the terminal acquires and feeds back the CSI according to a frequency-domain resource where the PDSCH corresponding to DCI locates.

Of course, in the method for feeding back CSI, the CSI may alternatively be fed back on the Nth subframe after the CSI feedback triggering instruction information triggers CSI feedback, wherein N is a natural number more than or equal to 1, and a value of N is a fixed integer or configured by high-layer signalling; or, the CSI is fed back at a preset location in a subframe, wherein the preset location includes one of: a PUCCH for feedback and a PUSCH for feedback on a preset bandwidth. When the CSI is fed back at the preset location in the subframe by a PUCCH, the CSI and A/N are transmitted together.

Figure 6:
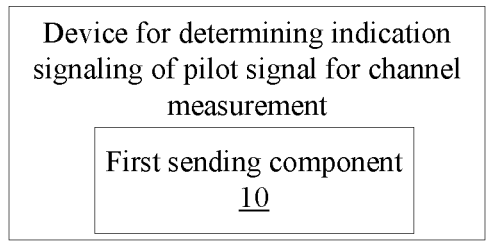
FIG. 6 is a structure diagram of a device for determining indication signalling of pilot signal for channel measurement according to an embodiment of the present disclosure.

The embodiment of the present disclosure further provides a device for determining indication signalling of a pilot signal for channel measurement. The device may be applied to a NodeB, and its structure diagram is shown in FIG. 6, including: a first sending component 10 configured to send DL control signalling, which includes transmission resource configuration information of a non-periodic CSI-RS, to a terminal, wherein the transmission resource configuration information of the non-periodic CSI-RS is used for determining a location of the non-periodic CSI-RS, and the non-periodic CSI-RS is used for instructing the terminal to perform channel measurement.

The transmission resource configuration information of the non-periodic CSI-RS sent by the first sending component 10 includes at least one piece of the following: information indicating a location of a subframe for sending a non-periodic CSI-RS, information indicating a location of a PRB pair for sending the non-periodic CSI-RS, information indicating the number of CSI-RS ports of the non-periodic CSI-RS, and information indicating a location of a RE, which is used for sending the non-periodic CSI-RS, in a PRB pair. In an implementation process, the first sending component 10 may further send the DL control signalling, which includes the transmission resource configuration information of the non-periodic CSI-RS, in at least one of manners as follows: sending a notice about the information indicating the location of the subframe to the terminal through physical layer configuration signalling; sending a notice about information indicating the location of the PRB pair to the terminal through physical layer control signalling; sending a notice about the information indicating the number of CSI-RS ports to the terminal through physical layer signalling and/or RRC signalling; and sending a notice about information indicating the location of the RE, which is used for sending the non-periodic CSI-RS, in the PRB pair to the terminal through the physical layer signalling and/or the RRC signalling.

Figure 7:
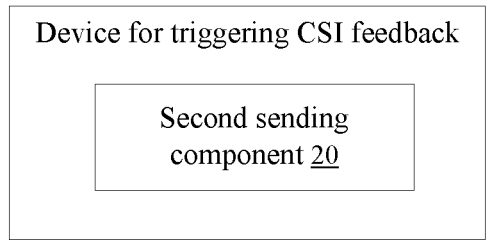
FIG. 7 is a first structure diagram of a device for triggering CSI feedback according to an embodiment of the present disclosure.

Based on the device for determining the indication signalling of the pilot signal for channel measurement, the embodiment of the present disclosure further provides a device for triggering CSI feedback. The device may also be applied to a NodeB, and is configured to send CSI feedback triggering instruction information to a terminal, and its structure diagram is shown in FIG. 7, including: a second sending component 20 configured to send the CSI feedback triggering instruction information and resource allocation information of a PDSCH to the terminal in the same control signalling format of DL control signalling, wherein the CSI feedback triggering instruction information is used for instructing the terminal to feed back CSI.

Figure 8:
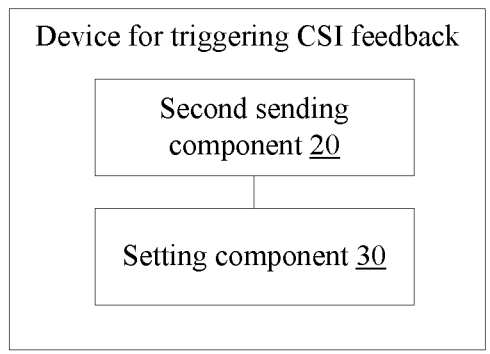
FIG. 8 is a second structure diagram of a device for triggering CSI feedback according to an embodiment of the present disclosure.

In an implementation process, the device may further include a setting component 30 configured to set a representation manner for the CSI feedback triggering instruction information, and as shown in FIG. 8, the setting component 30 may be coupled to the second sending component 20, wherein the setting component 30 is configured to set the CSI feedback triggering instruction information in one of manners as follows: setting transmission resource configuration information of the non-periodic CSI-RS to represent the CSI feedback triggering instruction information; setting Qbit signalling in the control signalling format to represent the CSI feedback triggering instruction information; and setting a partial state bit in the control signalling format to represent the CSI feedback triggering instruction information.

Figure 9:
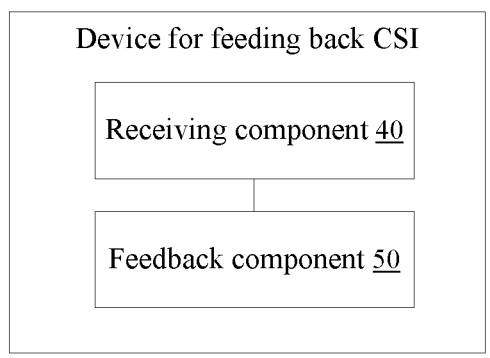
FIG. 9 is a structure diagram of a device for feeding back CSI according to an embodiment of the present disclosure.

The embodiment of the present disclosure further provides a device for feeding back a CSI. The device may be applied to a terminal, and its structure diagram is shown in FIG. 9, wherein the device includes: a receiving component 40 configured to receive CSI feedback triggering instruction information from a NodeB, wherein the CSI feedback triggering instruction information and resource allocation information of a PDSCH are sent in the same control signalling format of DL control signalling; and a feedback component 50 coupled to the receiving component 40 and configured to feed back CSI acquired according to the CSI feedback triggering instruction information to the NodeB.

Figure 10:
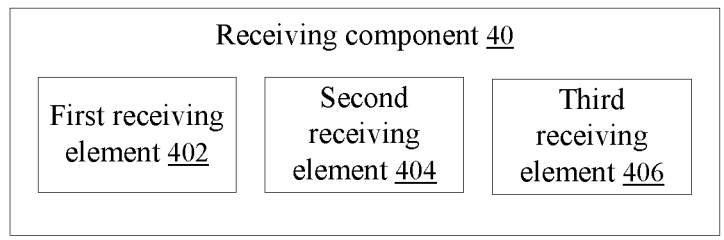
FIG. 10 is a structure diagram of a receiving component of a device for feeding back CSI according to an embodiment of the present disclosure.

FIG. 10 is an example structure diagram of the receiving component 40, wherein the receiving component 40 may further include: a first receiving element 402, configured to receive transmission resource configuration information of the non-periodic CSI-RS from the NodeB; a second receiving element 404 configured to receive one piece of state information of preset Qbit signalling from the NodeB; and a third receiving element 406 configured to receive a partial state bit set in the control signalling format from the NodeB. The three different receiving elements may be configured to receive CSI feedback triggering instruction information under different conditions.

The feedback component 50 may feed back the CSI acquired according to the CSI feedback triggering instruction information to the NodeB in at least one of manners as follows: acquiring and feeding back the CSI according to a pilot signal for channel measurement which locates in a resource location of a non-periodic CSI-RS, wherein the non-periodic CSI-RS is a signal sent by the NodeB to instruct the terminal to perform channel measurement; acquiring and feeding back the CSI according to a periodic CM-RS or a CRS; acquiring and feeding back the CSI according to a frequency-domain resource where the PDSCH corresponding to DCI locates; feeding back the CSI on the Nth subframe after the CSI feedback is triggered by the CSI feedback triggering instruction information, wherein N is a natural number more than or equal to 1, and a value of N is a fixed integer or configured by high-layer signalling; and feeding back the CSI at a preset location in a subframe, wherein the preset location includes one of the following: a PUCCH for feedback and a PUSCH for feedback on a preset bandwidth.

Example Embodiment

For the problems existing in the related art, the embodiment of the present disclosure provides a non-periodic CSI-RS signalling which is triggered by a physical layer signalling and a method for sending the non-periodic CSI-RS signalling, so as to reduce CSI-RS overhead and corresponding feedback complexity.

On a NodeB side, the NodeB sends transmission resource configuration information of the non-periodic CSI-RS which is carried in a physical layer control channel, to a terminal, wherein the transmission resource configuration information of the non-periodic CSI-RS includes at least one of: (1) information indicating a location of a subframe; (2) information indicating a location of a PRB pair; (3) information indicating the number of CSI-RS ports; and (4) information indicating an RE location of the CSI-RS in a PRB pair.

The NodeB may make an agreement on a method for determining a location of a subframe with the terminal, and the method includes: determining a location for sending a non-periodic CSI-RS according to the location of the subframe, on which physical layer configuration signalling is received by the terminal, and a preset rule, wherein the specific agreement rule may be set according to a practical need.

The NodeB may further notify the information indicating the location of the PRB pair for sending the non-periodic CSI-RS through physical layer control signalling, wherein the method includes that: the NodeB and the terminal make an agreement about multiple sets of locations of transmission RBs in advance, wherein each set corresponds to one RB Group, and one RB Group corresponds to a partial state location of DCI. The predefined multiple sets of locations of the transmission RBs include at least one of: (1) RB1 to RB[M/4]; (2) RB[M/4+1] to RB[M/2]; (3) RB[M/2+1] to RB[3M/4]; (4) RB[3M/4+1] to RB[M]; (5) RB1 to RB[M/2]; (6) RB[M/2+1] to RB[M]; (7) all RBs with odd index values; (8) all RBs with even indexes; and (9) the latest RBs transmitting a Physical Downlink Shared Channel (PDSCH), wherein M is the number of PRB pairs corresponding to a current bandwidth.

Furthermore, the preset sets of locations of transmission RBs may also be preset by a protocol or agreed by the NodeB through a high-layer signalling configuration. The number of ports of the non-periodic CSI-RS and the location of the non-periodic CSI-RS in the PRB pair are joint-coded.

The example embodiment further provides a method for triggering CSI feedback, and in the method, the NodeB side may send CSI feedback triggering instruction information to the terminal. In the method, the NodeB sends the CSI feedback triggering instruction information and resource allocation information of the PDSCH in the same control signalling format together.

The CSI feedback triggering instruction information may be determined according to whether the control signalling format contains transmission resource configuration information of the non-periodic CSI-RS or not, for example, CSI feedback is determined to be triggered under the condition that the transmission resource configuration information of the non-periodic CSI-RS is contained. When the CSI feedback is triggered, UE performs CSI calculation and feedback according to a pilot signal for channel measurement which locates at a resource location of a non-periodic CSI-RS. Such a manner that CSI feedback is triggered by the transmission resource configuration information of the non-periodic CSI-RS is equivalent to an implicit setting manner, and an explicit manner is introduced below.

The CSI feedback triggering instruction information may be represented by Qbit signalling set in the sent DL control signalling, wherein one state corresponds to non-triggering, each of the other states corresponds to a predefined CSI calculation and feedback rule, and Q is a natural number. Or, a partial state bit may further be set to represent the CSI feedback triggering instruction information.

When the UE on the terminal side receives the CSI feedback triggering instruction information, CSI feedback may be triggered.

When the CSI feedback is triggered, the UE acquires and feeds back CSI on the basis of a periodic CSI-RS or a CRS; or, when feedback is triggered, based on a frequency-domain resource where the PDSCH corresponding to DCI locates, the UE acquires the CSI according to a DMRS corresponding to a PDSCH; or, the UE determines to acquire and feed back the CSI according to a configured feedback mode; or, the terminal feeds back the CSI on the nth subframe after the CSI feedback is triggered by DL Grant of the DL control signalling, wherein n is a fixed integer or configured by high-layer signalling; or, the CSI may be fed back at a preset location in a subframe, wherein the preset location includes one of: a PUCCH for feedback and a PUSCH for feedback on a preset bandwidth. When the feedback information of the non-periodic CSI is transmitted through the PUCCH, the CSI and A/N may be transmitted together.

On a terminal side, the terminal receives the DL control signalling, acquires the CSI according to the CSI feedback triggering instruction information in the DCI, and sends the CSI.

In an example embodiment, the terminal sends the CSI to the NodeB through the PUCCH or the PUSCH. If the feedback information of the non-periodic CSI is transmitted through the PUCCH, the CSI may be transmitted together with A/N.

Furthermore, the feedback instruction information may be determined according to whether the control signalling format of the DL control signalling contains configuration information of pilot signal for channel measurement or not, or, non-periodic CSI-RS and feedback are simultaneously triggered. When the feedback is triggered, the UE performs CSI calculation and feedback according to the pilot signal for channel measurement which locates in the resource location of the non-periodic CSI-RS.

If the feedback instruction information is explicit Qbit signalling, a feedback manner is determined according to the received signalling. For the Qbit signalling, one state may be set to correspond to non-triggering, and each of the other states may be set to correspond to a predefined CSI calculation and feedback rule, wherein Q is a natural number.

Furthermore, when the feedback is triggered, the UE may further acquire and feed back the CSI on the basis of the periodic CSI-RS or the CRS.

The UE may further acquire and feed back the CSI according to the frequency-domain resource where the PDSCH corresponding to the DCI locates, or the acquisition and feedback of the CSI are determined according to a configured feedback mode, and when the CSI feedback is triggered, the UE acquires and feeds back the CSI according to the frequency-domain resource where the PDSCH corresponding to the DCI locates, then the UE acquires the CSI on the basis of the DMRS corresponding to the PDSCH.

In an example embodiment, the UE on the terminal side feeds back the CSI on the nth subframe after the DL Grant of the DL control signalling triggers the CSI feedback, and n is a fixed integer or configured through high-layer signalling.

According to the example embodiment, the NodeB transmits the non-periodic CSI-RS to the terminal, the terminal performs channel measurement according to the received transmitted non-periodic CSI-RS, the non-periodic CSI-RS may not be shared by multiple users or may be shared by only a few users under normal circumstances, but its overhead is lower. The non-periodic CSI-RS is not required to be configured for all terminals, and may be combined with a periodic CSI-RS as a good auxiliary measurement means to obtain more accurate channel quality information and adaptively judge a transmission technology.

The implementation mode is described below with reference to specific examples.

Embodiment 1

Different from a periodic CSI-RS, a non-periodic CSI-RS is generally sent only on one or few subframes. A location for sending the non-periodic CSI-RS in a PRB pair may refer to the sending Pattern of the periodic CSI-RS in the related art, and the difference lies in that the periodic CSI-RS is predetermined to be sent in the full bandwidth on the frequency domain and periodically sent on the time domain. The non-periodic CSI-RS may be selectively sent either in the full bandwidth or not in the full bandwidth on the frequency domain, and may be non-periodically sent on the time domain. Since the non-periodic CSI-RS is sent only when needed, location information about the sending of the non-periodic CSI-RS by the NodeB is required to be dynamically notified to a terminal.

The NodeB triggers the non-periodic CSI-RS in physical DL control signalling, which also includes some location information related to the non-periodic CSI-RS. The non-periodic CSI-RS may be preferably triggered in manners as follows:

1 bit signalling is used, 0 represents that the non-periodic CSI-RS is not triggered, and 1 represents that the non-periodic CSI-RS is triggered; or, 2 bit signalling is used, 00 represents that the non-periodic CSI-RS is not triggered, 01 represents that a first set of non-periodic CSI-RS is triggered, 10 represents that a second set of non-periodic CSI-RS is triggered and 11 represents that a third non-periodic CSI-RS is triggered.

Resource location configuration information corresponding to each set of non-periodic CSI-RS may be preconfigured and notified through high-layer RRC signalling; or, may be notified by a reserved corresponding field in current physical layer control signalling; or, a part of resource location configuration information may be sent through RRC signalling and the other part of resource location configuration information may be sent by a reserved field in the physical layer control signalling.

The resource location information may preferably include one or more pieces of the following information: (1) information indicating a location of a subframe; (2) information indicating a location a PRB pair; (3) information indicating the number of the CSI-RS ports; and (4) information indicating an RE location of the CSI-RS in a PRB pair. The example describes the preferred information only, but the resource location information should not be limited to the abovementioned information.

Except an explicit manner of introducing additional signalling bits to indicate the triggering and non-triggering of the non-periodic CSI-RS, other manners may also be adopted, for example, an information field of the non-periodic CSI-RS may be set to be an effective value to represent the triggering of the non-periodic CSI-RS.

The location configuration information of the CSI-RS includes a time-domain location, an RB location on the frequency domain and an RE location in an RB.

Figure 11:
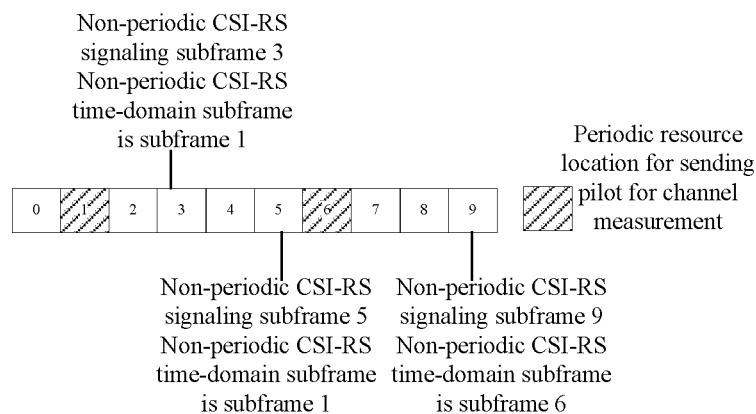
FIG. 11 is a diagram of time-domain locations of a non-periodic CSI-RS corresponding to notification signalling of different locations according to an example embodiment of the present disclosure.

The time-domain location information may be notified in a manner as follows: the time-domain location information may be determined according to a time-domain location of a subframe on which the current physical layer signalling is received, for example, the subframe for sending the non-periodic CSI-RS may be 1 or 2 subframes, which are capable of sending the CSI-RS and are closest to the current subframe, in one set of preconfigured periodic resource. The preconfigured periodic resource may be one set of periodic CSI-RS resources configured by high-layer signalling, and includes periodicity and subframe location parameters, and there are some fixed subframes which are subframes capable of sending the non-periodic CSI-RS. For example, the set of preconfigured periodic resource has a periodicity of 5 ms and an offset of 1, and non-periodic CSI-RS time-domain locations corresponding to notification signalling of different locations are shown in FIG. 11.

The time-domain location information may be determined according to the time-domain location where the current physical layer signalling subframe is received, the subframe for sending the non-periodic CSI-RS may be N subframes, which are capable of sending the CSI-RS and are closest to the current subframe, in M sets of preconfigured periodic resources, and M and N are both integers.

Or, the time-frequency location where the non-periodic CSI-RS is sent may further be specified or configured by signalling to be a subframe on which the current physical layer signalling subframe is received.

Or, the time-domain location where the non-periodic CSI-RS is sent is specified or configured by signalling to be obtained by subtracting one or more offsets from or adding one or more offsets to the index of the subframe on which the current physical layer signalling subframe is received, and the offsets are integral subframes. For example, when a current Transmission Time Interval (TTI) is subframe N, then a subframe where the non-periodic CSI-RS is located is N−offset or N+offset. The offset is an integer, and may be specified to be 1 or 2 in advance or configured by high-layer signalling.

Or, the current TTI is subframe N, then the subframes where the non-periodic CSI-RS is located are N−offset1 and N−offset2, or N+offset1 and N−offset2. Offset1 and offset2 are integers, and may be specified to be 1 or 2 in advance or configured by high-layer signalling.

The RB location on the frequency domain is notified in a manner as follows: the RB location on the frequency domain may be notified in a DCI format or in RRC signalling, or the location on the frequency domain may be determined by notifying a part of location in the RRC signalling and the other part of location in the DCI format.

The RB location may be notified by adopting a manner of defining RBG to reduce overhead. An RBG may be defined as follows:

RBG1 consists of the first RB to the (M/4)th RB, RBG2 consists of the (M/4+1)th RB to the (M/2)th RB, RBG3 consists of the (M/2+1)th RB to the (3M/4)th RB, RBG4 consists of the (3M/4+1)th RB to the Mth RB, RBG5 consists of the first RB to the (M/2)th RB, RBG5 consists of the (M/2+1)th RB to the Mth RB, RBG7 consists of the first RB to the Mth RB, and RBG8 is a set consisting of RBs, where the PDSCH locates, in the latest subframe (including the current subframe) on which the PDSCH is transmitted, wherein M is the number of RBs supported by a current bandwidth, and M/4, M/2 and 3M/4 are rounded down if not being integers.

Of course, the RBGs may alternatively be defined as follows: RBG1 consists of the first RB to the (M/2)th RB, RBG2 consists of the (M/2+1)th RB to the Mth RB, RBG3 consists of the first RB to the Mth RB and RBG4 is a set consisting of RBs, where the PDSCH locates, in the latest subframe (including the current subframe) on which the PDSCH is transmitted.

Or, the RBGs may alternatively be defined as follows: RBG1 consists of all RBs with odd indexes, RBG2 consists of all RBs with even indexes, RBG3 consists of the first RB to the Mth RB and RBG4 is a set consisting of RBs, where the PDSCH locates, in the latest subframe (including the current subframe) on which the PDSCH is transmitted.

The number of ports and the RE location in the PRB pair are notified in a manner as follows: the number of ports of the non-periodic CSI-RS may be notified through physical layer signalling, for example, the number of ports may be notified to be 1, 2, 4 or 8 through 2 bit signalling.

The location of the non-periodic CSI-RS in the PRB pair may be notified through physical layer signalling, for example, a CSI-RS pattern where the non-periodic CSI-RS is located and a location of the non-periodic CSI-RS in the pattern are notified.

Alternatively, a part of the information may be notified through the RRC signalling, and the other part of the information may be notified through the high-layer signalling. For example, the number of ports and the pattern where the non-periodic CSI-RS is located are notified through the RRC signalling. The location in the pattern is notified through the physical layer signalling.

Alternatively, the pattern may be notified through the RRC signalling, and the number of ports and the location in the pattern may be notified through the physical layer signalling. Furthermore, a joint-coding manner in Table 2 (joint-coding example 1 for number of ports and RE location) may be adopted for notification.

TABLE 2

| 1 port,RE1 | 2 port,RE1,2 |
| 1 port,RE2 | 2 port,RE3,4 |
| 1 port,RE3 | 2 port,RE5,6 |
| 1 port,RE4 | 2 port,RE7,8 |
| 1 port,RE5 | 4 port,RE1,2,3,4 |
| 1 port,RE6 | 4 port,RE5,6,7,8 |
| 1 port,RE7 | 8 port,RE1,2,3,4,5,6,7,8 |
| 1 port,RE8 | — |

Or, the number of ports of the non-periodic CSI-RS is specified to be minimally 2, then joint-coding changes are shown in Table 3 (joint-coding example 2 for number of ports and RE location).

TABLE 3

| 2 port,RE1,2 |
| 2 port,RE3,4 |
| 2 port,RE5,6 |
| 2 port,RE7,8 |
| 4port,RE1,2,3,4 |
| 4port,RE5,6,7,8 |
| 8port,RE1,2,3,4,5,6,7,8 |
| — |

The non-periodic CSI-RS information may be sent on DL Grant of physical layer control signalling. The DL Grant refers to a DCI format for sending resource allocation information related to a downlink data channel, for example, the DCI formats 2B and 2C in the related art belong to DL Grants.

The non-periodic CSI-RS resource location configuration information may be sent together with the DL Grant. In such a manner, since the non-periodic CSI information is always sent together with the PDSCH information, the RBs, where the PDSCH locates, in the subframe may be utilized as the location for sending the non-periodic CSI-RS on the frequency domain.

The non-periodic CSI-RS resource location configuration information may alternatively be sent together with UL Grant. In such a manner, the UL Grant may be adopted to simultaneously send the non-periodic CSI-RS resource location configuration information and perform corresponding CSI feedback triggering, and the CSI is subsequently transmitted on a PUSCH resource indicated by the UL Grant. The UL Grant refers to a DCI format for sending resource allocation information related to an uplink data channel, for example, the DCI formats 0 and 4 in the related art belong to DL Grants.

Embodiment 2

A NodeB sends a CSI-RS mainly for expecting a terminal to carry out measurements by virtue of the CSI-RS. For non-periodic feedback, the NodeB needs to perform non-periodic CSI triggering.

The NodeB may trigger non-periodic CSI feedback in a DL Grant, so that a time interval between CSI-RS sending and CSI feedback may be greatly shortened, and the problem of inaccuracy caused by a time-domain channel change is reduced; and in addition, overhead may further be reduced.

When non-periodic CSI feedback is triggered by DL Grant, multiple CSI processes may be predefined, and bit states of signalling are adopted to represent different meanings, for example, 4 states of 2 bit signalling are adopted to represent non-triggering, CSI process1 triggering, CSI process2 triggering and CSI process3 triggering respectively.

Or, 8 states of 3 bit signalling are adopted to represent non-triggering, CSI process1 triggering, CSI process2 triggering, CSI process3 triggering, CSI process4 triggering, CSI process5 triggering, CSI process6 triggering, CSI process1 triggering and CSI process8 triggering respectively.

The NodeB may further utilize non-periodic CSI-RS triggering as a triggering signalling for CSI feedback corresponding to the non-periodic CSI-RS. For example, provided that the NodeB notifies the sending of the non-periodic CSI-RS and the corresponding resource location information to UE in the DL Grant, then the UE does not require additional signalling notification, and feeds back corresponding CSI information on the nth subframe after the notification according to a preset rule.

After feedback corresponding to the non-periodic CSI-RS is triggered, the terminal further performs channel measurement and CSI calculation according to a sending location of the non-periodic CSI-RS. The CSI mainly includes Rank Indication/Precoding Matrix Indication/Channel Quality Indication (RI/PMI/CQI), and the terminal further calculates and feeds back PMI and CQI corresponding to each RB for the RBs for sending the non-periodic CSI-RS, and calculates and feeds back RI for all the RBs. It is important to note that, when the DL Grant triggers CSI feedback, the UE may perform measurement by virtue of the non-periodic CSI-RS, and may alternatively perform channel measurement by virtue of a DMRS.

Or, the terminal further calculates and feeds back the PMI and CQI corresponding to each RB for the RBs for sending the non-periodic CSI-RS, and calculates and feeds back the RI for all the RBs.

The terminal may also feed back the CSI on the nth subframe after the DL Grant triggers CSI feedback, and n is a fixed integer or configured by high-layer signalling.

The non-periodic CSI feedback information may also be fed back at a preset location in a subframe, for example, on a PUCCH or on a PUSCH in a preset bandwidth. When the non-periodic CSI feedback information is transmitted through the PUCCH, the non-periodic CSI feedback information may be bound together with A/N for transmission.

Embodiment 3

A sending location of a non-periodic CSI-RS is not limited to the patterns which have already been defined at present. When the non-periodic CSI-RS and a PDSCH of UE are sent at the same time, the non-periodic CSI-RS may be in an area dedicated for data transmission outside the patterns.

Figure 12:
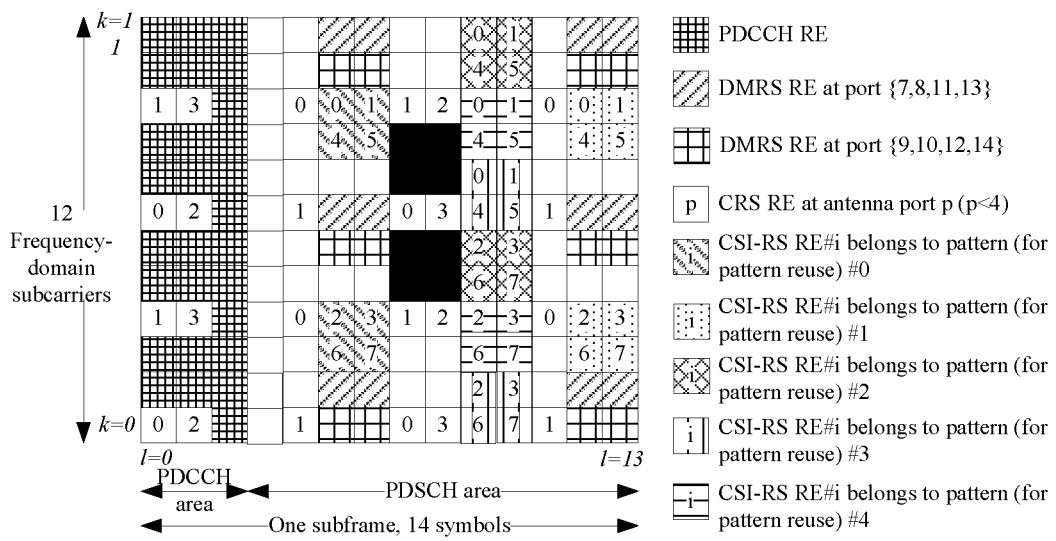
FIG. 12 is a diagram of additionally developing resources without influence on configuration of a periodic CSI-RS according to an example embodiment of the present disclosure.

Therefore, resources may be additionally developed without influence on the configuration of a periodic CSI-RS, for example, the REs marked as black in FIG. 12 may also be configured to transmit the non-periodic CSI-RS.

From the above, it can be seen that the embodiments of the present disclosure achieve technical effects as follows:

according to the embodiments of the present disclosure, the non-periodic CSI-RS is determined according to the transmission resource configuration information of the non-periodic CSI-RS, and channel measurement is further performed according to the non-periodic CSI-RS, so that the problems of higher overhead and resource waste caused by periodical sending of a CSI-RS in the related art may be solved, resources are saved, and sending overhead is reduced.

Obviously, those skilled in the art should know that each component or step of the present disclosure may be implemented by a universal computing device, and the components or steps can be concentrated on a single computing device or distributed on a network formed by a plurality of computing devices, and may optionally be implemented by programmable codes executable for the computing devices, so that the components or steps may be stored in a storage device for execution with the computing devices, or the shown or described steps may be executed in a sequence different from the sequence here under a certain condition, or the components or steps may form each integrated circuit component, or multiple components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

INDUSTRIAL PRACTICABILITY

The technical solutions provided by the embodiments of the present disclosure may be applied to the field of communication, the non-periodic CSI-RS is determined according to the transmission resource configuration information of the non-periodic CSI-RS, and channel measurement is further performed according to the non-periodic CSI-RS, so that the problems of higher overhead and resource waste caused by periodical sending of a CSI-RS in the related art may be solved, resources are saved, and sending overhead is reduced.

What is claimed is:

1. A method for determining indication signaling of a pilot signal for channel measurement, comprising:
    sending, by a NodeB, Downlink (DL) control signaling, which comprises transmission resource configuration information of non-periodic Channel State Information Reference Signal (CSI-RS), to a terminal, wherein the transmission resource configuration information of the non-periodic CSI-RS is used for determining a location of the non-periodic CSI-RS, and the non-periodic CSI-RS is used for instructing the terminal to perform channel measurement,
    wherein sending, by the NodeB, the DL control signaling, which comprises the transmission resource configuration information of the non-periodic CSI-RS, to the terminal comprises:
    sending, by the NodeB, the transmission resource configuration information of the non-periodic CSI-RS and resource allocation information of a Physical Downlink Shared Channel (PDSCH) to the terminal in the same Downlink Control Information (DCI) format) of the DL control signaling; or,
    sending, by the NodeB, the transmission resource configuration information of the non-periodic CSI-RS and resource allocation information of a Physical Uplink Shared Channel (PUSCH) to the terminal in the same DCI format of the DL control signaling;
    further comprising: when DL Grant of the DL control signaling triggers CSI feedback, feeding back, by the terminal, a CSI on an Nth subframe after the DL Grant triggers the CSI feedback, wherein N is a natural number more than or equal to 1, and a value of N is a fixed integer or configured by high-layer signaling.

2. The method according to claim 1, wherein the transmission resource configuration information of the non-periodic CSI-RS comprises at least one of: information indicating a location of a subframe for sending the non-periodic CSI-RS, information indicating a location of a Physical Resource Block (PRB) pair for sending the non-periodic CSI-RS, information indicating the number of CSI-RS ports of the non-periodic CSI-RS, and information indicating a location of Resource Element (RE), which is used for sending the non-periodic CSI-RS, in a PRB pair.

3. The method according to claim 2, wherein sending, by the NodeB, the DL control signaling, which comprises the transmission resource configuration information of the non-periodic CSI-RS, to the terminal comprises at least one of the following:

sending, by the NodeB, a notice about the information indicating the location of the subframe to the terminal through physical layer configuration signaling;

sending, by the NodeB, a notice about the information indicating the location of the PRB pair to the terminal through physical layer control signaling;

sending, by the NodeB, a notice about the information indicating the number of the CSI-RS ports to the terminal through physical layer signaling and/or Radio Resource Control (RRC) signaling; and sending, by the NodeB, a notice about the information indicating the location of the RE, which is used for sending the non-periodic CSI-RS, in the PRB pair to the terminal through physical layer signaling and/or RRC signaling.

4. The method according to claim 3, wherein a method for determining a location for sending the non-periodic CSI-RS comprises: determining the location for sending the non-periodic CSI-RS according to the information indicating the location of the subframe and a preset rule, wherein the information indicating the location of the subframe is carried in the physical layer configuration signaling received by the terminal.

5. The method according to claim 3, wherein sending, by the NodeB, the notice about the information indicating the location of the PRB pair to the terminal through the physical layer control signalling comprises: presetting, by the NodeB and the terminal, multiple sets al locations of transmission Resource Blocks (RBs), wherein each of the multiple sets of locations of transmission RBs corresponds to one RB Group, and one RB Group corresponds to a part of state locations of Downlink Control Information (DCI).

6. The method according to claim 3, wherein the number of CSI-RS ports of the non-periodic CSI-RS and the information indicating the location of the RE, which is used for sending the non-periodic CSI-RS, in the PRB pair are joint-coded.

7. The method according to claim 1, wherein the transmission resource configuration information of the non-periodic CSI-RS is sent in N preset subframes of the DL control signaling, wherein N is an integer more than 1.

8. A device for determining indication signaling of a pilot signal for channel measurement, which is applied to a NodeB and comprises:

a first sending component, configured to send Downlink (DL) control signaling, which comprises transmission resource configuration information of non-periodic Channel State Information Reference Signal (CSI-RS), to a terminal, wherein the transmission resource configuration information of the non-periodic CSI-RS is used for determining a location of the non-periodic CSI-RS, and the non-periodic CSI-RS is used for instructing the terminal to perform channel measurement, wherein the first sending component is configured to:

send the transmission resource configuration information of the non-periodic CSI-RS and resource allocation information of a Physical Downlink Shared Channel (PDSCH) to the terminal in the same Downlink Control Information (DCI) format) of the DL control signaling; or, send the transmission resource configuration information of the non-periodic CSI-RS and resource allocation information of a Physical Uplink Shared Channel (PUSCH) to the terminal in the same DCI format of the DL control signaling.

9. The device according to claim 8, wherein the transmission resource configuration information of the non-periodic CSI-RS sent by the first sending component comprises at least one of:

information indicating a location of a subframe for sending the non-periodic CSI-RS, information indicating a location of a Physical Resource Block (PRB) pair for sending the non-periodic CSI-RS, information indicating the number of CSI-RS ports of the non-periodic CSI-RS, and information indicating a location of Resource Element (RE), which is used for sending the non-periodic CSI-RS, in a PRB pair.

10. The device according to claim 9, wherein the first sending component sends the DL control signaling, which comprises the transmission resource configuration information of the non-periodic CSI-RS, in at least one of manners as follows:

sending a notice about the information indicating the location of the subframe to the terminal through physical layer configuration signaling;

sending a notice about the information indicating the location of the PRB pair to the terminal through physical layer control signaling;

sending a notice about the information indicating the number of the CSI-RS ports to the terminal through physical layer signaling and/or Radio Resource Control (RRC) signaling; and sending a notice about the information indicating the location of the RE, which is used for sending the non-periodic CSI-RS, in the PRB pair to the terminal through the physical layer signaling and/or the RRC signaling.

11. The method according to claim 5, wherein each of the multiple sets of locations of transmission RBs comprises at least one of:

(1) RB1 to RB[M/4]; (2) RB[M/4+1] to RB[M/2]; (3) RB[M/2+1] to RB[3M/4];

(4) RB[3M/4+1] to RB[M]; (5) RB1 to RB[M/2]; (6) RB[M/2÷1] to RB[M]; (7) all

RBs with odd index values; (8) all RBs with even indexes; and (9) the latest RBs transmitting a Physical Downlink Shared Channel (PDSCH), wherein M is the number of PRB pairs corresponding to a current bandwidth.

12. The method according to claim 5, wherein the preset multiple sets of locations of transmission RBs are specified by a protocol in advance, or the preset multiple sets of locations of transmission RBs are agreed by the NodeB through a high-layer signaling configuration.

* * * * *